United States Patent
Panchagnula et al.

(10) Patent No.: US 10,567,273 B2
(45) Date of Patent: Feb. 18, 2020

(54) METHOD AND APPARATUS FOR BYPASS ROUTING OF MULTICAST DATA PACKETS AND AVOIDING REPLICATION TO REDUCE OVERALL SWITCH LATENCY

(71) Applicant: CAVIUM, LLC, San Jose, CA (US)

(72) Inventors: Vamsi Panchagnula, San Jose, CA (US); Saurin Patel, San Jose, CA (US); Keqin Han, Fremont, CA (US)

(73) Assignee: Cavium, LLC, San Jose, CA (US)

( * ) Notice: Subject to any disclaimer, the term of this patent is extended or adjusted under 35 U.S.C. 154(b) by 290 days.

(21) Appl. No.: 14/671,900

(22) Filed: Mar. 27, 2015

(65) Prior Publication Data

US 2016/0285744 A1    Sep. 29, 2016

(51) Int. Cl.
*H04L 12/707* (2013.01)
*H04L 12/18* (2006.01)
*H04L 12/935* (2013.01)
*H04L 12/715* (2013.01)
*H04L 12/761* (2013.01)

(52) U.S. Cl.
CPC .............. *H04L 45/24* (2013.01); *H04L 12/18* (2013.01); *H04L 45/16* (2013.01); *H04L 45/64* (2013.01); *H04L 49/30* (2013.01)

(58) Field of Classification Search
CPC ......... H04L 45/24; H04L 45/64; H04L 45/16; H04L 49/30; H04L 12/18
USPC ........................................................ 370/390
See application file for complete search history.

(56) References Cited

U.S. PATENT DOCUMENTS

| | | | |
|---|---|---|---|
| 7,796,627 B2 | 9/2010 | Hurley et al. | |
| 2007/0121630 A1* | 5/2007 | Stephen | H04L 49/201 370/390 |
| 2007/0297406 A1* | 12/2007 | Rooholamini | H04L 12/185 370/390 |
| 2009/0175286 A1* | 7/2009 | Naven | H04L 49/201 370/412 |
| 2011/0170542 A1* | 7/2011 | Liu | H04L 12/18 370/390 |
| 2013/0322244 A1* | 12/2013 | Matthews | H04L 49/251 370/235 |
| 2014/0098816 A1* | 4/2014 | Matthews | H04L 49/201 370/390 |
| 2014/0098818 A1* | 4/2014 | Matthews | H04L 45/74 370/392 |

* cited by examiner

*Primary Examiner* — Faisal Choudhury

(57) ABSTRACT

An apparatus for routing multicast data packets, the apparatus includes an ingress port to receive data streams of multicast data packets and status data about egress ports available to transmit the multicast traffic data streams. A processor coupled to the ingress port, to identify source data of the multicast data packets of the data streams to match the multicast data packets with available egress ports. The processor to determine, using the identified source and status data which of the multicast data packets matches the available egress ports. The processor to select a first data path coupled to the egress port to transmit the matched multicast data packets to available egress ports where the selected first data path is configured to enable the direct transmission of the matched multicast data packets to available egress ports.

20 Claims, 4 Drawing Sheets

METHOD AND APPARATUS FOR BYPASS ROUTING OF MULTICAST DATA PACKETS AND AVOIDING REPLICATION TO REDUCE OVERALL SWITCH LATENCY

TECHNICAL FIELD

The present disclosure relates generally to the field of network data transmission, and, more particularly, to systems and methods for faster routing of multicast packet data by using bypass switching mechanisms to increase the throughput of multicast data packets transmitted and to avoid replication during a processing clocking cycle thereby reducing overall switch latency times.

BACKGROUND

In a data switching network, data traffic is categorized into various flows which are stored in a number of queues in a buffer. In a router or other network element, the queues for the stored flows typically compete for a common outgoing communications link or egress port (e.g., a physical communications link or a pseudo-wire). Thus, the buffered queues need to be scheduled on the egress side. Accordingly, processing is required by packet scheduling devices on the egress in the router prior to transmission to select which of the queued packets will be the next in line for outgoing transmission.

Typically, in a routing process, data packets coming in from different source ports are classified based on their source and destination ports and traffic types. They are subsequently sorted into different queues in the buffer. The state of each queue is updated when a packet enters into a queue. Based on the output port availability, the scheduler selects the right scheduling algorithm to dequeue the packets from the corresponding queues. The state of each queue will be updated when a packet moves out of a queue. This process adds latency time in the routing of the data packets in the range of 150 clock cycles.

Additional latency time is incurred in the processing of multicast for classifying of data packets based on their source and destination ports and traffic types, subsequently sorting the data packets into different queues, updating the state of each queue when a data packet enters into the queue, and based on port availability having a scheduler select the right scheduling algorithm to dequeue the packets from the corresponding queues in the buffer, and which has to be repeated separately for each of the data packets replicated. Also, Quality of Service (QoS) algorithmic checks are required for each of the copies of the data packets replicated when there is needed a guarantee of preferential service as in occurrences of high priority traffic, such as control traffic or voice/video latency sensitive traffic, transmissions.

For example, if the incoming data packets are to be broadcast to 128 egress ports, the total latency would be in the range of the latency time per processing cycle of the data packets of 150 clocks cycles increased by a factor related to the 128 egress ports or a latency in the range of 128×150 clock cycles. This increased latency is undesired for some applications.

Accordingly, when transmitting multicast data packets there is a need to bypass and eliminate redundant processing steps to reduce overall latency times associated with the broadcasting of the multicast data packets to multiple ports.

SUMMARY OF THE INVENTION

Therefore, it would be advantageous to provide a multicast packet routing bypass mechanism that offers flexibility of multiple data paths of transmission to alleviate processing steps and reducing latency times.

Accordingly, one embodiment of the present invention employ methods of routing multicast data packets, the method includes receiving, at an ingress port, data streams of multicast data packets and status data about egress ports available to transmit the multicast traffic data streams. Then, identifying, by a processor coupled to the ingress port, source data of the multicast data packets of the data streams to match the multicast data packets with available egress ports. Further, determining, by the processor, using the identified source and status data which multicast data packets match available egress ports. Subsequently, selecting, by the processor, a first data path coupled to the egress port to transmit the matched multicast data packets to available egress ports where the selected first data path is configured to enable the direct transmission of the matched multicast data packets to available egress ports.

According to another embodiment of the present invention for routing multicast data packets includes an ingress port to receive data streams of multicast data packets and status data about egress ports available to transmit the multicast traffic data streams. A processor, coupled to the ingress port, to identify source data of the multicast data packets of the data streams to match the multicast data packets with available egress ports. The processor to determine, using the identified source and status data which of the multicast data packets matches the available egress ports. The processor, to select a first data path coupled to the egress port to transmit the matched multicast data packets to available egress ports where the selected first data path is configured to enable direct transmission of the matched multicast data packets to available egress ports.

According to yet another embodiment of the present invention ensures by the unit of the processor, the transmitted matched multicast data packets on the selected data path are from one source to the available egress port. Additionally, the processor determines, using the source and status data which multicast data packets do not match available egress ports. Whereupon, the processor selects a second data path coupled to an egress port for transmitting unmatched multicast data packets, wherein the selected second data path includes additional processing operations for the multicast data packets prior to transmission.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
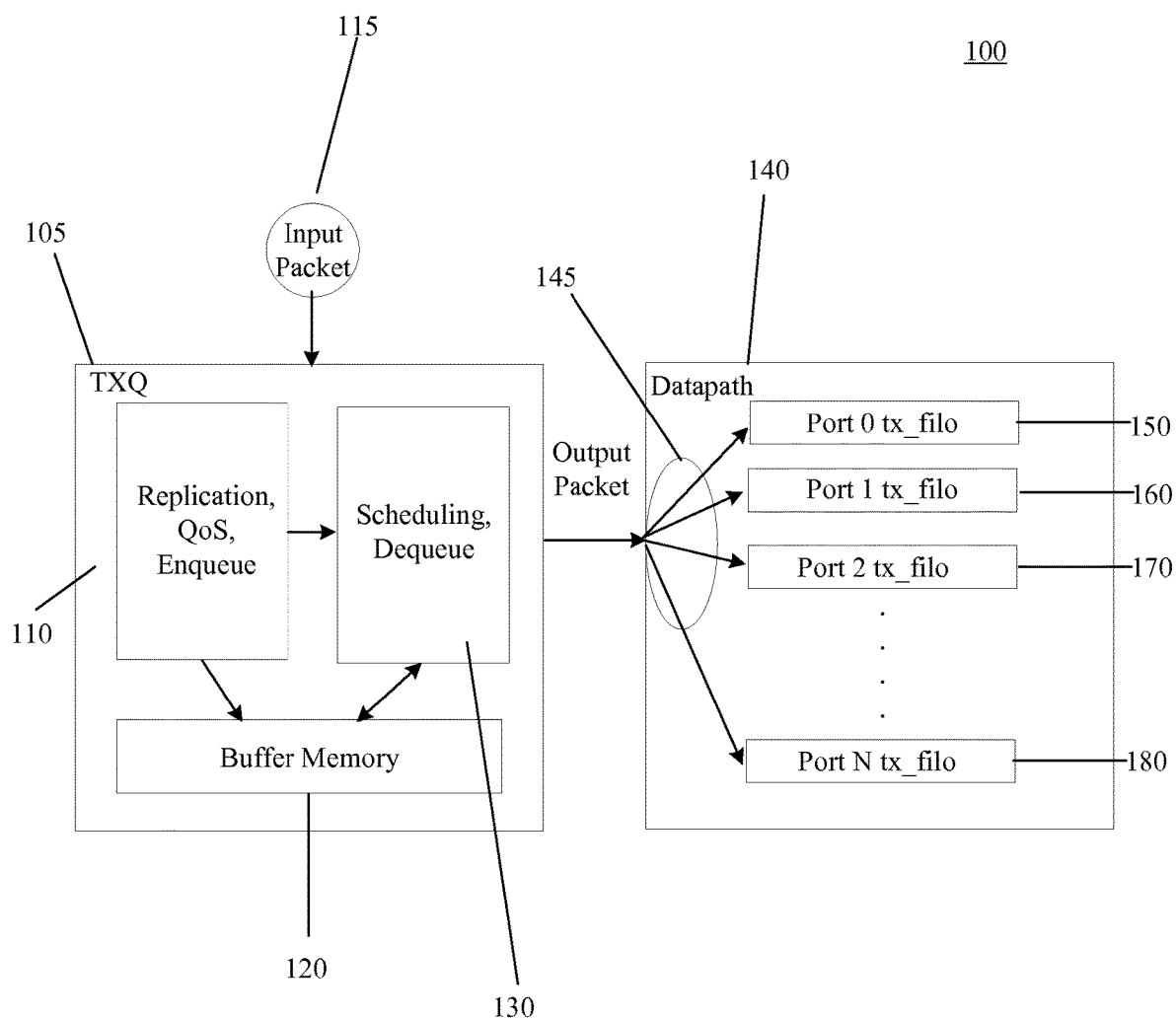
FIG. 1 is a block diagram of the related art depicting a configuration of the Transmit Queue (TxQ) modules in an exemplary router, in accordance with the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Transmission Queue of Data Packets

Overall, embodiments of the present disclosure utilize a scheduling tree (or a hierarchical scheduling process) to schedule outgoing packets at a data routing device. Generally, there are two types of incoming packets of data that are received and transmitted during a scheduling cycle. There are data packets that when received are transmitted in a one-to-one arrangement and there are data packets that when received are transmitted in a one-to-many arrangement. The first type is known as unicast data transmission where a single incoming packet of data is processed and transmitted as a single outgoing packet. The second type is multicast data packet transmission where single incoming packets of data are processed, replicated and multiple data packets are transmitted from the single data packets received. Table 1.0 shows the unicast and multicast packet transfer corresponding to the Ports available.

TABLE 1.0

| Port 0, Ports n |
|---|
| 1:1 Unicast |
| 1:n Multicast |

FIG. 1 is a block diagram of the related art depicting a configuration unicast data packet transmission of the Transmit Queue (TxQ) modules in an exemplary router sending data packets to datapaths. The TxQ module 100 routes data traffic over a communication network includes an ingress port 105, a buffer memory 120, egress ports 150-180, first circuitry 110 and scheduler circuitry 130. The ingress port 105 is configured to receive data streams. The first circuitry 110 includes replication, QoS and Enqueue modules and is coupled to buffer unit 120. The first circuitry 110 is coupled to the ingress port 105 and is configured with the buffer memory 120 to store the input data streams. The egress ports 150-180 are coupled to the scheduler circuitry 130 and configured to transmit the data streams. The first circuitry is coupled to the ingress port and the buffer memory 120 and configured to map incoming data traffic into data groups. The scheduler circuitry 130 is configured to select an egress port of the apparatus. At ingress port 105, data packets are received from different source ports of devices to the ingress port 105. The data packets are sorted into multiple queues in the buffer memory 120. When a new data packet is received at a particular queue, the state of the queue is updated. Subsequently, the data packets in the selected queue is dequeued and sent to the selected target port for transmission. When a packet moves out from the selected queue, the state of each queue is updated. The foregoing steps of queuing and dequeuing are repeated for each scheduling cycle. In some embodiments, the apparatus 100 is performed by circuitry in a data routing device, such as a router, switch, a hub, etc. In some other embodiment, the apparatus 100 is implemented as a computer program executable by a processor, for example in a software-defined network (SDN).

Bypass Switch Routing of Data Packets

Figure 2:
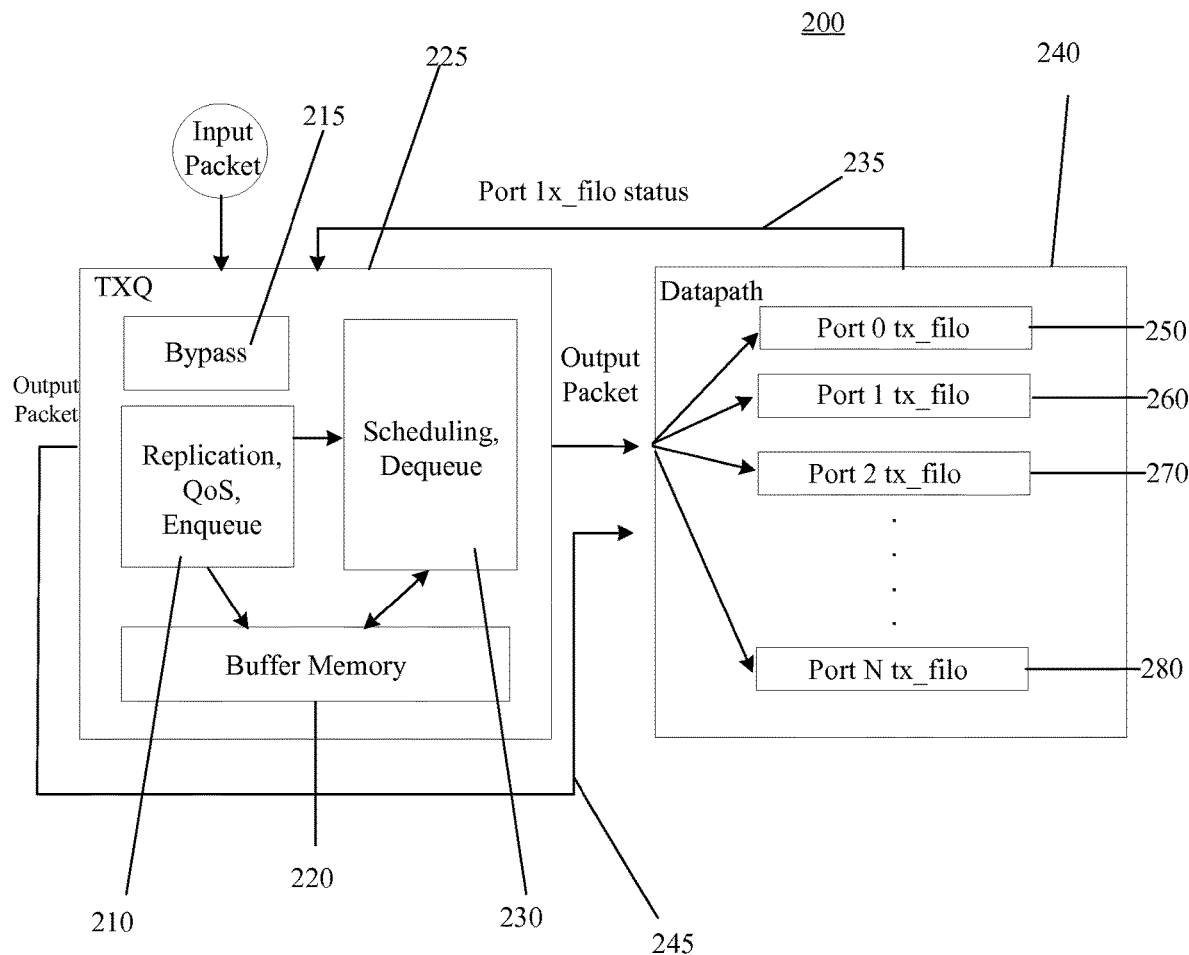
FIG. 2 is a block diagram of a switch mechanism in multicast data packet transmission which is used to bypass particular TxQ modules depicting the configuration of the Transmit Queue (TxQ) modules in an exemplary router in accordance with an embodiment of the present disclosure.

FIG. 2 is a block diagram of a switch mechanism in multicast data packet transmission which is used to bypass particular TxQ modules depicting the configuration of the Transmit Queue (TxQ) modules in an exemplary router in accordance with an embodiment of the present disclosure. A bypass mechanism 215 is included in the front end of the apparatus 200 for receiving incoming multicast data packets 205. The incoming multicast data packet includes an N-bit vector in the header data packet. By analyzing the N-bit vector information, the number of copies of a multicast data packet for transmitting can be determined. For example, a 64-bit or 128-bit vector would require 64 or 128 destination addresses for transmission. Additionally, the N-bit vector corresponds to the number of ports available. The size of the N-bit vector can be up to 300 bits. The multicast data packets are processed by the bypass switch block 215 and then to the first circuitry 210, to the buffer memory 220 and to scheduling device 230.

Header Packet

| Diagram 1.1 | | | | |
|---|---|---|---|---|
| SRC-Port | TC | Dst.BitMap | HDR-Ptr | Body_Ptr |
| 86 | 36 | N-bit | | |

To the egress modules 250-280, replications of the multicast data packets are transmitted by the ingress modules 225. In other words, there are at least two sets of multicast data packets that are sent to the egress ports, the original received multicast data packet and the replicated copy which is outputted by the scheduling device 230. By analyzing the input packet feed, and looking at the Dst.BitMap data of the header, the number of multicast data packets to be replicated can be ascertained. Hence, the input multicast data packet feed includes an N-bit vector and by analyzing the N-bit vector, it can be determined by the bypass unit 215 and the replication modules 210 how many multicast data packets are to be copied. A 2-bit marking will indicate the destination port the multicast data packet is to be sent to. Additionally, in the header packet above, the N Bit informs the ingress TxQ blocks 225 how many multicast data packets to replicate and the number to be replicated corresponds to the number of ports that are available. The entire header packet received is approximately 300 bits. The header packet received is also known as the token received. The header data of the data packet is extracted from incoming network packets at time of receipt at the ingress port 225. From the time of receipt of the multicast data packet 205 to time of outputting the packet by the scheduling device 230 is close to 150 Mbps clock latency. Therefore, bypassing the modules of the Replication, QoS, Enqueue 210, the buffer memory 220 and the scheduling device 230, the latency time of a per multicast data packet is reduced by or in the range of 150 Mbps when transmitted to the egress ports 250-280. Additionally, the steps of enqueuing the data packets to the buffer 220 and dequeuing the data packets by the scheduling device 230 are eliminated.

Figure 3:
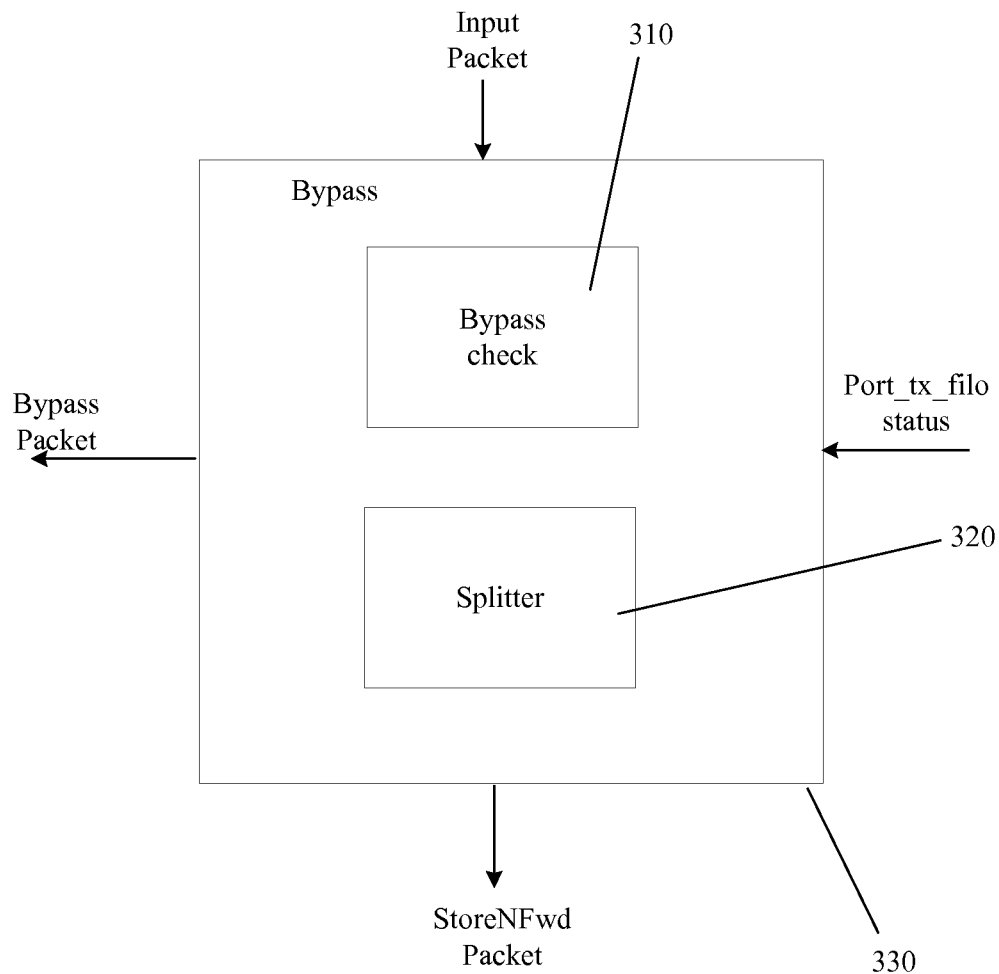
FIG. 3 illustrates a bypass unit and includes a bypass check and splitter unit in accordance with an embodiment of the present disclosure.

In FIG. 3, the bypass unit 300 includes a bypass check 310 and splitter 320. The bypass unit 300 receives the port_tx_fifo status signal from the egress modules (See block 420 in FIG. 2). The port_tx_fifo status signal is generally all the relevant destinations for sending the multicast data packets. The multicast data packets received by the bypass unit 300 are directly sent to port_tx_fifo per clocking cycle and the particular port N sent to is selected according to a 2-bit marking in the header multicast packet data. In other words, multiple multicast data packets are sent in parallel to the Port 0 . . . N shown in FIG. 2 modules 250-280. In such instances, the TXQ ingress modules (FIG. 2 block 225), do not perform a replication step of the received multicast data packets. Only one multicast data packet with the destinations ports bit map Dst.BitMap is transmitted and based on the destinations ports bit map Dst.BitMap, the additional multicast data packets to be sent. The sending operation is a multiple sending operation using the splitter 320 of the bypass unit 300. In other words, the multicast data packets are duplicated or replicated or copied but sent at the same time multiple times using the splitter 320 to the multiple tx_fifo blocks 250-280 along a forward data path 245 shown in FIG. 2.

In the bypass unit 300, the port_tx_fifo status is received, which represents the per port congestion in the TX path 245 of FIG. 2. If a port is congested, meaning that the port is unavailable, the multicast data packet is sent to the buffer memory 220 of FIG. 2 to be stored and will be enqueued in the buffer memory 220 by the replication-Qos-Enqueue module 210 of FIG. 2. Hence, in this instance, the multicast data packets would be prevented from bypassing the TXQ unit modules and reside in the buffer memory 220 until port availability is ascertained by the scheduling unit 230, which would dequeue the multicast data packet and transmit the multicast data packets to the available ports 250-280. Generally, all the multicast data packets for non-congested ports checked by the bypass check 310 are sent to the splitter 320 and tx data path 245 and directly to the port_tx_fifo.

For example, in an instant example, upon receiving the multicast data packet, the bypass check 310 would examine the port 0 and N status and determine how many multicast data packets to be sent. In other words, at the onset, the bypass unit 300 would examine the header packet data and determine how many copies by a multiplexing operation of the multicast data packet are needed and which ports to send the multicast data packets. Therefore, based on destination port available, the bypass check 310 will decide whether to bypass all TXQ by the bitmap data. The bypass table operation is shown below in Table 1.3 below:

TABLE 1.3

| Bypass Operation |
|---|
| Scenario 1: BYP: All destinations sent in incoming bitmap |
| Scenario 2: BYP: Partial destinations sent in incoming bitmap |
| Scenario 3: BYP: No destinations sent in incoming bitmap |

Figure 4:
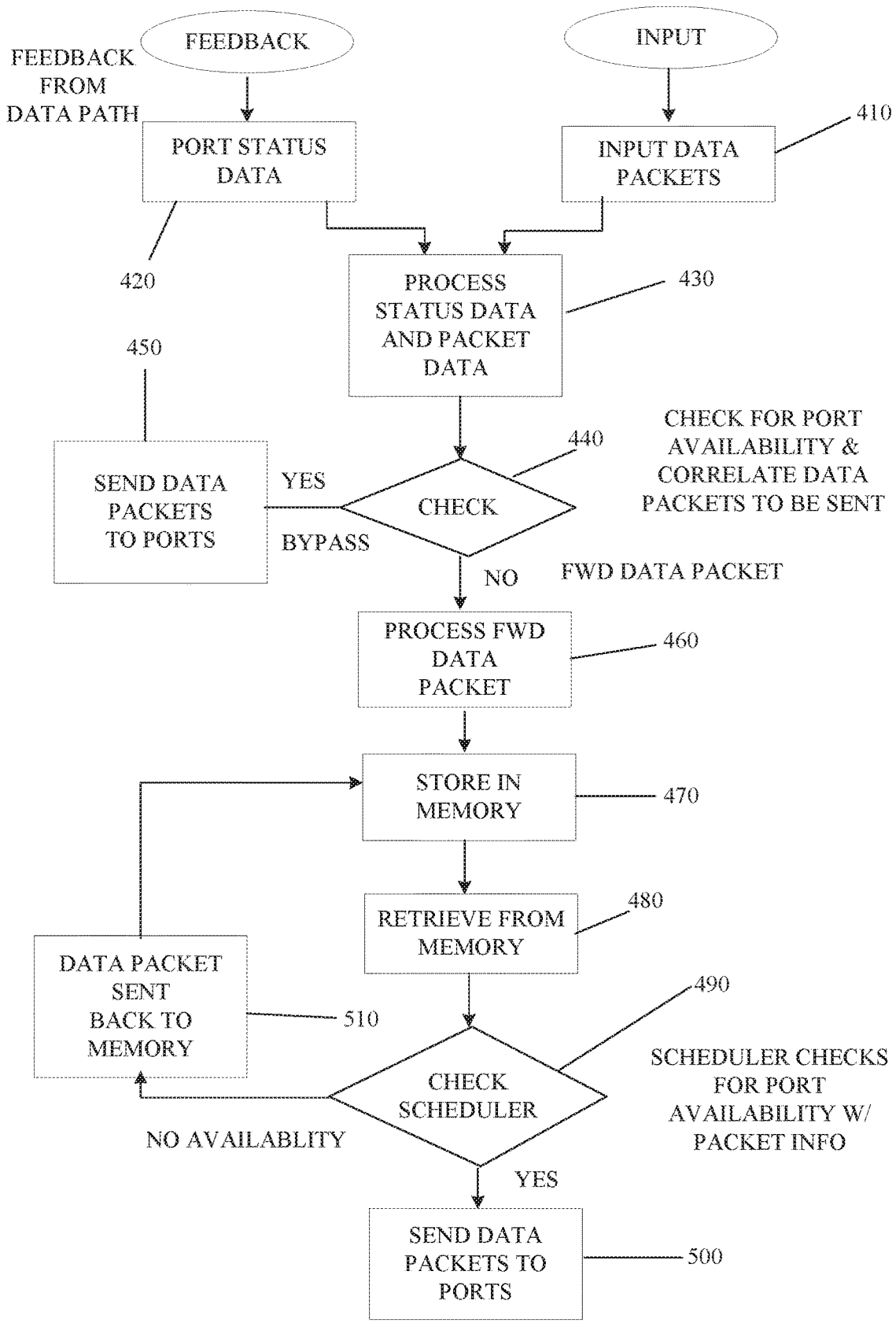
FIG. 4 is a flow chart depicting an exemplary set of processing steps of the TxQ modules in accordance with an embodiment of the present disclosure.

In FIG. 4, which is a flow chart 400 depicting an exemplary set of processing steps of the TxQ modules in accordance with an embodiment of the present disclosure. At step 410, the multicast data packets are retrieved; in parallel to step 410, at step 420, port status information about destination port availability is also received. At step 430, both the multicast data packets information consisting of the header information along with the port status information is processed. At step 440, a check is performed whether to bypass the steps 460-510 and send the multicast packet data directly to the available ports, which is executed in step 450. Here, when bypassed, multiple ports are sent multicast data packets in parallel. If not bypassed, the multicast data packets are processed at step 460 and stored in memory at step 470. Subsequently, at step 480 the multicast data packets are retrieved from memory according to a scheduling algorithm and at step 490 a check is performed to determine destination port availability. If available, the multicast data is sent to the available ports at step 500, if not available, the data is sent back to memory at step 510. If at step 440, all the multicast data packets are bypassed and sent to the destination ports at step 450, this would be Scenario 1 in table 1.3 of all destinations sent in incoming bitmap. If only some of the multicast data packets are sent to processing step 460-510, and some to step 460, this would be the Scenario 2 of partial destinations sent in incoming bitmap. And the Scenario 3, would be when no data packets are sent to step 450 and all are sent for storing and forwarding to processing steps 460-510. The steps 410-510 of checking to bypass are performed in one clock cycle. By analyzing the status from all the ports at step 430 with the relevant multicast data feeds, at step 440 a check is performed to bypass all destinations of the incoming bit map, bypass partial ports or bypass none of the ports.

Example of Bypass Routing to Port Availability

In table 1.4 below, there is shown an example of the 1:10 port availability bypass check performed.

TABLE 1.4

| Bypass examples | | |
|---|---|---|
| 1:10 | 10 | 0 |
| 1:10 | 6 | 4 |
| 1:10 | 0 | 10 |

For example, multicast data packets with destination ports 1-10 are received by the TXQ module. The packets are next received by the bypass check where the port_tx_fifo status is high for ports 2 and 3 and ports 5 and 6. A high indication would mean that the ports are unavailable or congested. The splitter would create a copy of the multicast data packet and send one multicast data packet with the destination port bitmap to the non-high signaled ports, or the ports 1, 4, and 7-10. The original packet is sent to the buffer memory to be stored. This packet is then forwarded by the scheduler with the destination ports bitmap to ports initially set to 1 which where ports 2-3 and 5-6. Additionally, the settings of high and low are configurable and therefore, determinations or decisions to drop the multicast packet data or replicate the packet data for each of the destination ports is configurable by toggling the high and low settings signaled.

According to the present disclosure, by checking the port availability, multicast data packets can bypass TXQ modules, multicast packet data is sent directly to multiple FIFOs, the multicast data may be sent with multiple sets by examination of the header information associated with data traffic and by the status of the destination ports. In addition, the routing process according to the present disclosure advantageously offers the flexibility for users to adapt the aforementioned control to varying business needs, customized policies, etc.

It will be appreciated that the circuitry shown in the apparatus 200 can be implemented as application specific integrated circuits (ASIC), application-specific standard parts (ASSPs), System-on-Chip (SoC), field-programmable gate arrays (FPGAs), etc. Further, it will be appreciated that the router may include various other functions and components that are well known in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of routing multicast data packets, said method comprising:
retrieving a multicast data packet of said multicast data packets;
receiving a status signal indicating availability of each egress port of a plurality of egress ports, wherein said retrieving said multicast data packet is performed in parallel to said receiving said status signal;
identifying a first set of said egress ports to be used for transmitting said multicast data packet, wherein said first set of egress ports comprises two or more egress ports of said plurality of egress ports;
based on said status signal, identifying a second set of egress ports that are available, selected from said first set of egress ports;
determining a number of copies of said multicast data packet to be replicated based on information contained in said multicast data packet, wherein said number of copies of said multicast data packet corresponds to a number of egress ports comprised in said second set of egress ports;
and
if said second set of egress ports contains some ports that is less than all ports of said first set of egress ports:
bypassing a set of processing operations for said some ports prior to transmission of said multicast data packet, and directly transmitting said multicast data packet to said some ports.

2. The method of claim 1, further comprising:
if said second set of egress ports contains said some ports of said first set of egress ports:
performing said set of processing operations for ports exclusive of said some ports prior to transmission of said multicast data packet to said ports exclusive of said some ports, wherein said set of processing operations comprise: a Quality of Service (QoS) algorithmic check on said multicast data packet and storing said multicast data packet,
wherein said directly transmitting said multicast data packet comprises:
using a splitter to send copies of said multicast data packet to said some ports.

3. The method of claim 1, wherein said directly transmitting said multicast data packet comprises bypassing replication of said multicast data packet.

4. The method of claim 1, wherein said directly transmitting said multicast data packet comprises one or a combination of: bypassing enqueuing said multicast data packet in a buffer memory, and bypassing dequeuing said multicast data packet from said buffer memory.

5. The method of claim 1, further comprising:
identifying a third set of egress ports from said first set of egress ports based on said status signal;
enqueuing said multicast data packet in a buffer memory;
dequeuing said multicast data packet from said buffer memory; and
transmitting said multicast data packet to said third set of egress ports following said dequeuing, wherein said third set of egress ports is exclusive of said second set of egress ports and is encompassed in said first set of egress ports.

6. The method of claim 1, further comprising: determining said first set of egress ports based on a destination bitmap in a header of said multicast data packet.

7. The method of claim 1, wherein said status signal indicates per-egress port congestion, wherein an egress port in said first set of egress ports indicated as congested according to said status signal is not included in said second set of egress ports that are available.

8. A device for routing multicast data packets, said device comprising:
an ingress port;
a plurality of egress ports; and
bypass logic coupled to said ingress port and configured to:
retrieve a multicast data packet of said multicast data packets;

receive a status signal indicating availability of each egress port of said plurality of egress ports, wherein retrieving said multicast data packet is performed in parallel to said reception of said status signal;

from said plurality of egress ports, identify a first set of egress ports to be used for transmitting said multicast data packet, wherein said first set of egress ports comprises two or more egress ports;

based on said status signal, identify a second set of egress ports that are available, selected from said first set of egress ports;

determine a number of copies of said multicast data packet to be replicated based on information contained in said multicast data packet, wherein said number of copies of said multicast data packet corresponds to a number of egress ports comprised in said second set of egress ports; and if said second set of egress ports contains some ports that are less than all ports of said first set of egress ports: bypass a set of processing operations for said some ports prior to transmission of said multicast data packet, and directly transmit said multicast data packet to said some ports.

9. The device of claim 8, wherein said bypass logic is further configured to:

if said second set of egress ports contains said some ports of said first set of egress ports:

perform said set of processing operations for ports exclusive of said some ports prior to transmission of said multicast data packet to said ports exclusive of said some ports, wherein said set of processing operations comprise: a Quality of Service (QoS) algorithmic check on said multicast data packet and storing said multicast data packet, and wherein said bypass logic comprises a splitter configured to:

send copies of said multicast data packet to said some ports.

10. The device of claim 8, further comprising:

a buffer memory; and enqueuing logic configured to enqueue a data packet in said buffer memory prior to sending said data packet to an egress port of said two or more egress ports, wherein said bypass logic is configured to directly transmit said multicast data packet to said second set of egress ports without said multicast data packet being enqueued by said enqueuing logic into said buffer memory.

11. The device of claim 10, further comprising:

replication logic configured to replicate said data packet prior to sending said data packet to said egress port of said two or more egress ports, wherein said bypass logic is configured to directly transmit said multicast data packet to said second set of egress ports without said multicast data packet being replicated by said replication logic.

12. The device of claim 8, further comprising:

a buffer memory; and a scheduler configured to dequeue a data packet from said buffer memory according to a scheduling process.

13. The device of claim 12, wherein the scheduler is further configured to:

determine availability of ports exclusive of said some ports; and enqueue said multicast data packet in said buffer memory if said ports exclusive of said some ports are unavailable.

14. The device of claim 8, further comprising:

a buffer memory;

enqueuing logic configured to enqueue said multicast data packet in said buffer memory; and a scheduler configured to:

dequeue said multicast data packet from said buffer memory; and transmit said multicast data packet to a third set of egress ports following dequeuing, wherein said third set of egress ports is exclusive of said second set of egress ports and is encompassed in said first set of egress ports.

15. The device of claim 14, wherein said bypass logic is further configured to: based on said status signal, identify said third set of egress ports from said first set of egress ports.

16. The device of claim 8, wherein said bypass logic is further configured to: directly transmit said multicast data packet to said second set of egress ports in parallel.

17. The device of claim 8, wherein said status signal indicates per-egress port congestion, wherein an egress port in said first set of egress ports indicated as congested according to said status signal is not included in said second set of egress ports that are available.

18. A system comprising:

a processor; and a memory coupled to said processor and storing instructions that when executed by said processor, implement a method of routing multicast data packets, said method comprising:

retrieving a multicast data packet of said mutlicast data packets;

receiving a status signal indicating availability of each egress port of a plurality of egress ports, wherein said retrieving said multicast data packet is performed in parallel to said receiving said status signal;

identifying a first set of said egress ports to be used for transmitting said multicast data packet, wherein said first set of egress ports comprises two or more egress ports of said plurality of egress ports;

based on said status signal, identifying a second set of egress ports that are available, selected from said first set of egress ports, wherein said status signal indicates per-egress port congestion, wherein an egress port in said first set of egress ports indicated as congested according to said status signal is not included in said second set of egress ports that are available;

determining a number of copies of said multicast data packet to be replicated based on information contained in said multicast data packet, wherein said number of copies of said multicast data packet corresponds to a number of egress ports comprised in said second set of egress ports; and if said second set of egress ports contains some ports that is less than all ports of said first set of egress ports: bypassing a set of processing operations for said some ports prior to transmission of said multicast data packet, and directly transmitting said multicast data packet to said some ports.

19. The system of claim 18, wherein said method further comprises:
  if said second set of egress ports contains said some ports of said first set of egress ports:
    performing said set of processing operations for ports exclusive of said some ports prior to transmission of said multicast data packet to said ports exclusive of said some ports, wherein said set of processing operations comprise: a Quality of Service (QoS) algorithmic check on said multicast data packet and storing said multicast data packet, and
  wherein said directly transmitting said multicast data packet comprises, for transmission to said second set of egress ports, bypassing one or more of: replicating said multicast data packet, enqueuing said multicast data packet in a buffer memory, and dequeuing said multicast data packet from said buffer memory.

20. The system of claim 18, wherein said method further comprises:
  enqueuing said multicast data packet in a buffer memory;
  dequeuing said multicast data packet from said buffer memory; and
  transmitting said multicast data packet to a third set of egress ports following said dequeuing, wherein said third set of egress ports is exclusive of said second set of egress ports and is encompassed in said first set of egress ports.

* * * * *